March 17, 1964 M. L. KLEIN ETAL 3,125,759

MAGNETIC RECORDING DEVICE

Filed March 28, 1958

INVENTORS
MARTIN L. KLEIN
JOHN S. SUTTON
BY
John A. Duffy
AGENT 3,125,759
Patented Mar. 17, 1964

3,125,759
MAGNETIC RECORDING DEVICE

Martin L. Klein, Woodland Hills, and John S. Sutton, San Jose, Calif., assignors to North American Aviation, Inc.

Filed Mar. 28, 1958, Ser. No. 724,608
4 Claims. (Cl. 346—74)

Figure 1:
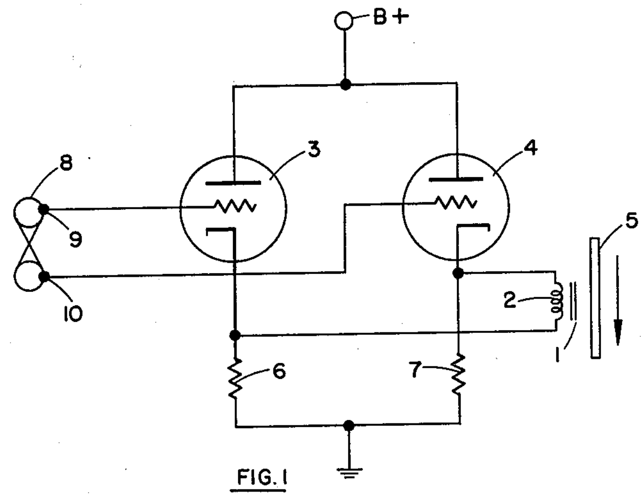

This invention relates to magnetic recording circuits and particularly to a circuit for utilizing the entire recording head winding of a magnetic recorder for reversibly magnetizing the magnetic head.

In electronic systems such as computers there is often required a means for recording digital information in the form of voltage pulses on a magnetic medium. To accomplish the conversion of voltage pulses to magnetic storage information, magnetic heads are provided which are responsive to the voltage pulses so as to spot magnetize the magnetic medium, thereby recording information thereon. For reasons of design and economy, it is desirable to employ magnetic heads having a single winding only. Since the information to be stored is almost always required to be codified in such a way that certain spots of magnetization will have one polarity, or orientation of their magnetic poles, while other spots have reverse polarity, some means must be provided for reversibly magnetizing a magnetic head with only one winding.

In the past, circuits have been developed to provide reversible magnetization of a magnetic head by providing for the reversing of the flow of current in the winding of the magnetic head. One method used heretofore utilized a center tapped winding on a magnetic head with each half of the head winding alternately passing current so that the overall direction of current flow would alternately reverse. The above method for providing reversible current flow in a single head winding involves complicated circuitry which creates special design and manufacturing problems. Other present-day methods also are complicated and inefficient, leaving much to be desired from the standpoint of simplicity and economics.

The device of this invention overcomes the above listed and other disadvantages of present-day magnetic heads by providing a simple and economical circuit for reversing the flow of current through a single head winding. The winding is connected between a corresponding pair of output electrodes of a pair of electronic valves. The electronic valves are responsive to electrical pulses containing the recording information and alternatively conduct creating a pair of current paths. The head winding is located in each of the current paths so as to pass current in one direction when one of the electronic valves is conducting and to pass current in a reverse direction when the other electronic valve is conducting.

It is therefore an object of this invention to provide an improved magnetic recording system.

It is another object of this invention to provide an improved circuit for reversibly magnetizing a magnetic head having one winding only.

It is still another object of this invention to provide a circuit for reversibly magnetizing a magnetic head having one winding which requires no center tap winding.

It is a further object of this invention to provide a circuit for reversibly magnetizing a magnetic head having one winding which requires no ground connection.

It is a still further object of this invention to provide a circuit for reversibly magnetizing a magnetic head having one winding which is readily adaptable to record the condition of a flip flop.

Figure 2:
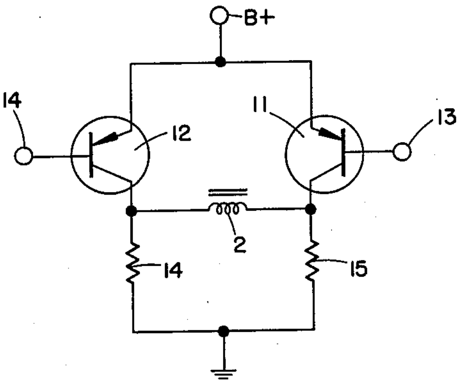

Other objects will become apparent from the following description taken in connection with the accompanying drawings in which FIG. 1 is a circuit diagram showing a way of carrying out the invention using vacuum tubes; and FIG. 2 is a circuit diagram of an alternative embodiment of the invention using transistors.

Referring to FIG. 1 there is shown a magnetic head 1 with a winding 2 having one end connected to the cathode of triode 3 and the other end connected to the cathode of triode 4. Magnetic medium 5, which may be a magnetic tape or magnetic drum, for example, is suitably spaced in relation with head 1 to receive the pulse information transmitted thereto by the current flowing through winding 2. Triodes 3 and 4 are connected as a dual recording pulse amplifier stage with triode 3 having its plate connected to B+ and its cathode connected through resistor 6 to ground. Similarly triode 4 has its plate connected to B+ and its cathode connected through resistor 7 to ground. Resistors 6 and 7 may be of any value depending on the desired current through winding 2. Triodes 3 and 4 are responsive to positive pulse signals at their grids to conduct alternatively. Thus, for example, the grid of triode 3 may be connected to be responsive to the output of a bistable device 8 when device 8 is in one condition producing a relatively positive signal at output terminal 9, and the grid of triode 4 may be connected to be responsive to the output of bistable device 8 when device 8 is in the other condition producing a relatively positive signal at output terminal 10 and a relatively negative signal at output terminal 9. It is thus readily seen that triode 3 is conducting and triode 4 is non-conducting when terminal 9 is positive and triode 4 is conducting and triode 3 is non-conducting when terminal 10 is positive.

In operation, assume first that device 8 is in the condition wherein a positive output signal from terminal 9 causes conduction in triode 3. Current flows from B+ through the plate-cathode of triode 3 and thence through two parallel current paths, one being resistor 6, and the other being winding 2 and resistor 7, to ground. Triode 4 is cut off receiving a negative signal at its grid from terminal 10. Now assume, for example, that device 8 changes condition and it is desired to record this change in condition on magnetic medium 5. Terminal 10 now being positive causing triode 4 to conduct and terminal 9 goes negative cutting off triode 3. A current path is now created between B+, the plate-cathode of triode 4, thence, through parallel paths resistor 7 and winding 2 and resistor 6 to ground. Current is now flowing in a reverse direction through winding 2 from the direction it was flowing when triode 3 was conducting. This reversal in direction of current through winding 2 creates a change in magnetic flux in head 1 which is received and recorded by magnetic medium 5. The next change in condition of bistable device 8 causes conduction in triode 3 and non-conduction in triode 4 which reverses the direction of flow in winding 2 again which is recorded on medium 5. It is now readily apparent that triodes 3 and 4 alternately driven conductive serve as a polarity reversing switch feeding current in either direction through winding 2.

The amount of flux created in head 1 may be controlled by varying the current through winding 2. This may be accomplished by varying the operating characteristics of triodes 3 and 4 so as to allow more or less current to flow in their respective cathode circuits. The current in winding 2 may also be controlled by varying the relation of the resistance of resistors 6 and 7 to the resistance of winding 2. Thus, for example, increasing the values of resistors 6 and 7 correspondingly increases the current flowing through winding 2. Also, the potentials at either end of winding 2 may be changed by varying the values of resistors 6 and 7. It is to be noted that winding 2 is connected in a relatively low potential portion of the circuit by being connected to the cathodes of triodes 3 and 4, thus reducing substantially the servicing and insulation problems connected with the recording circuit.

Critical damping of the inductance of head 1 is easily obtained due to the flexible design characteristics created by connecting winding 2 to the cathodes of triodes 3 and 4. Thus, the ratio of resistance to inductance of winding 2, which determines critical damping, may readily be controlled by varying the gain of the triodes 3 and 4. It is also to be noted from the circuit of FIG. 1 that the entire winding 2 has current flowing in it during both directions of current flow.

The circuit of FIG. 1 may readily be applied to a digital computer system having bistable devices such as device 8 with terminal 9 producing a signal when device 9 is in a "1" condition, for example, and terminal 10 producing a signal when device 9 is in a "0" condition. Winding 2, responsive to the conditions of device 9, produces a current in one direction indicating "1" and the opposite direction indicating "0." Thus, "1" and "0" information is stored on medium 5.

FIGURE 2 shows an alternative embodiment of the invention utilizing transistor circuitry. P-n-p transistors 11 and 12 receive control signals from terminals 13 and 14 which connect their respective bases to the output of device 8 which is furnishing information to be recorded, for example, bistable device 8 of FIG. 1. Winding 2 has one end connected to the collector of transistor 12 and the other end connected to the collector of transistor 13. A positive pulse signal received at terminal 14 causes conduction in transistor 12 thereby creating a flow of current from the collector of transistor 12 through winding 2 and resistor 15 to ground. Conversely, a positive pulse signal received at terminal 13 causes conduction in transistor 11 creating a flow of current from the collector of transistor 11 through winding 2 and resistor 14 to ground which is in the reverse direction to the previous current path created by conduction of transistor 12.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a magnetic recording system with a magnetic head having one winding, means for reversibly magnetizing said magnetic head comprising a pair of electronic valves, each said valve having an anode, a control, and a cathode electrode, said anodes connected in common to the positive terminal of a direct-current supply source, each said cathode connected through a respective resistor to the minus terminal of said direct-current source, the control electrodes of said valves being connected to be responsive to a trigger signal whereby conductivity is limited to one of said valves at a given time, one terminal of the winding of said magnetic head being connected to one of said cathodes and the other terminal of said winding being connected to the other said cathode, whereby conduction in one of said valves according to said direct-current source produces current flow in said winding in one direction and conduction in the other said valve produces current flow in said winding in a reverse direction.

2. In a magnetic recording system with a magnetic head having one winding, means for reversibly magnetizing said magnetic head comprising a first and second electronic valve, each said valve having an anode, a control, and a cathode electrode, said anodes connected in common to the positive terminal of a direct-current supply source, the cathode of said first valve connected through a first resistor to the minus terminal of said direct-current source, the cathode of said second valve connected through a second resistor to the minus terminal of said direct-current source, the control electrodes of said valves being connected to be responsive to a trigger signal whereby conductivity is limited to one of said valves at a given time, one terminal of the winding of said magnetic head being connected to the cathode of said first valve and the other terminal of said winding being connected to the cathode of said second valve, whereby conduction in said first valve according to said direct-current source produces a first pair of parallel current paths, one of said paths comprising the positive terminal of said direct-current source, the anode-cathode circuit of said first valve, said first resistor, and the minus terminal of said direct-current source, the other said path comprising the positive terminal of said direct-current source, the anode-cathode circuit of said first valve, said winding, said second resistor, and the minus terminal of said direct-current source.

3. The combination recited in claim 2 wherein conduction in said second valve produces a second pair of parallel current paths, one of said paths comprising the positive terminal of said direct-current source, the anode-cathode circuit of said second valve, said second resistor, and the minus terminal of said direct-current source, the other said path comprising the positive terminal of said direct-current source, the anode-cathode circuit of said second valve, said winding, said first resistor, and the minus terminal of said direct-current source.

4. The system of claim 2 including a bistable device having first and second conditions indicated by first and second mutually distinct signals provided at first and second output terminals thereof; the connection of said control electrodes to be responsive to a trigger signal comprising a connection of one of said control electrodes to the first output terminal of said bistable device and a connection of the other of said control electrodes to the second output terminal of said bistable device.

References Cited in the file of this patent

UNITED STATES PATENTS

| | | |
|---|---|---|
| 2,540,654 | Cohen | Feb. 6, 1951 |
| 2,614,227 | Bordewick et al. | Oct. 14, 1952 |
| 2,838,675 | Wanlass | June 10, 1958 |
| 2,853,559 | Leonard | Sept. 23, 1958 |
| 2,900,215 | Schoen | Aug. 18, 1959 |
| 2,996,349 | Mauch | Aug. 15, 1961 |

FOREIGN PATENTS

| | | |
|---|---|---|
| 788,949 | Great Britain | Jan. 8, 1958 |